May 3, 1938.  C. R. LIVERMON  2,115,864
BOAT OR OTHER VEHICLE
Filed May 21, 1935    3 Sheets-Sheet 1
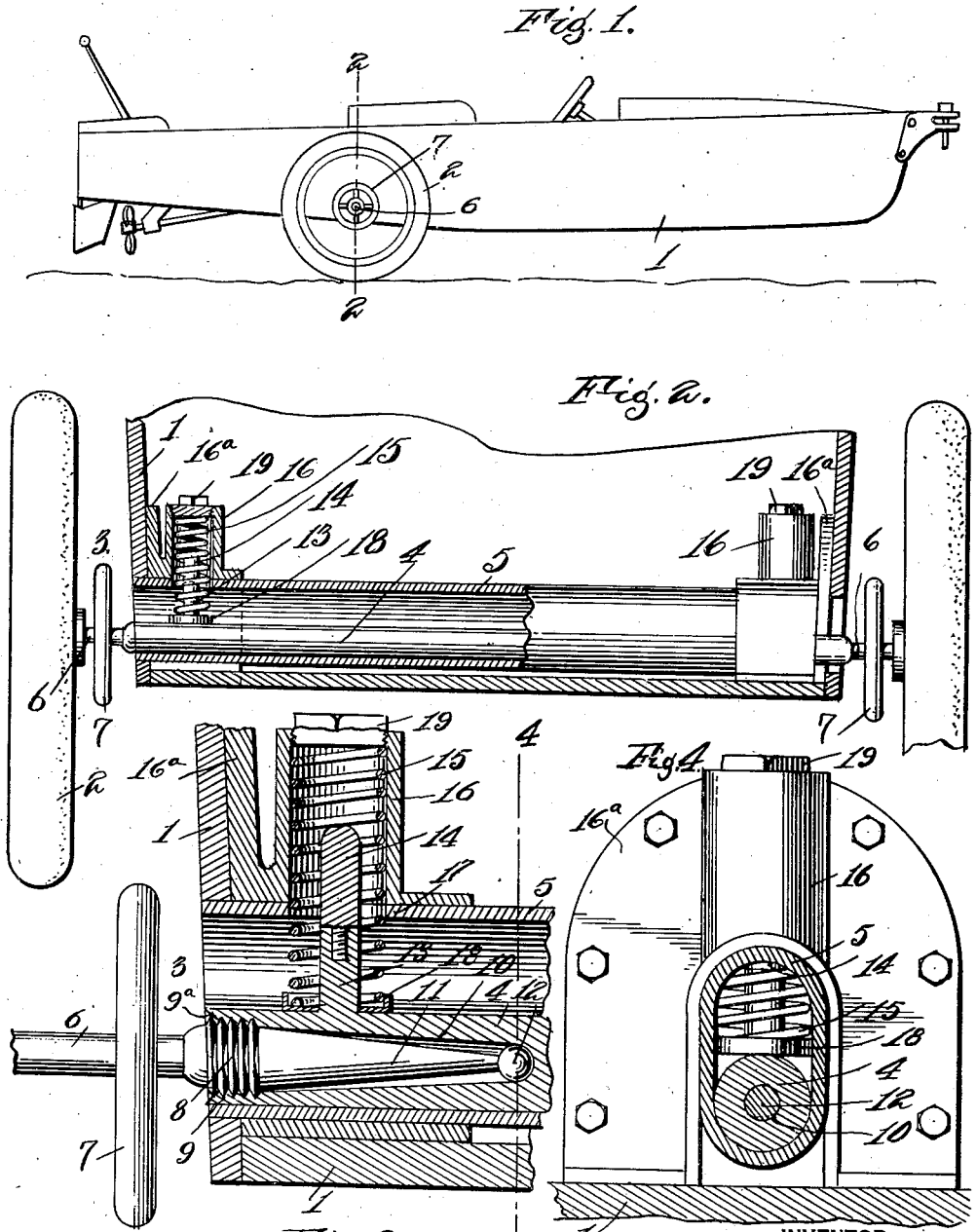

May 3, 1938. C. R. LIVERMON 2,115,864
BOAT OR OTHER VEHICLE
Filed May 21, 1935 3 Sheets-Sheet 2
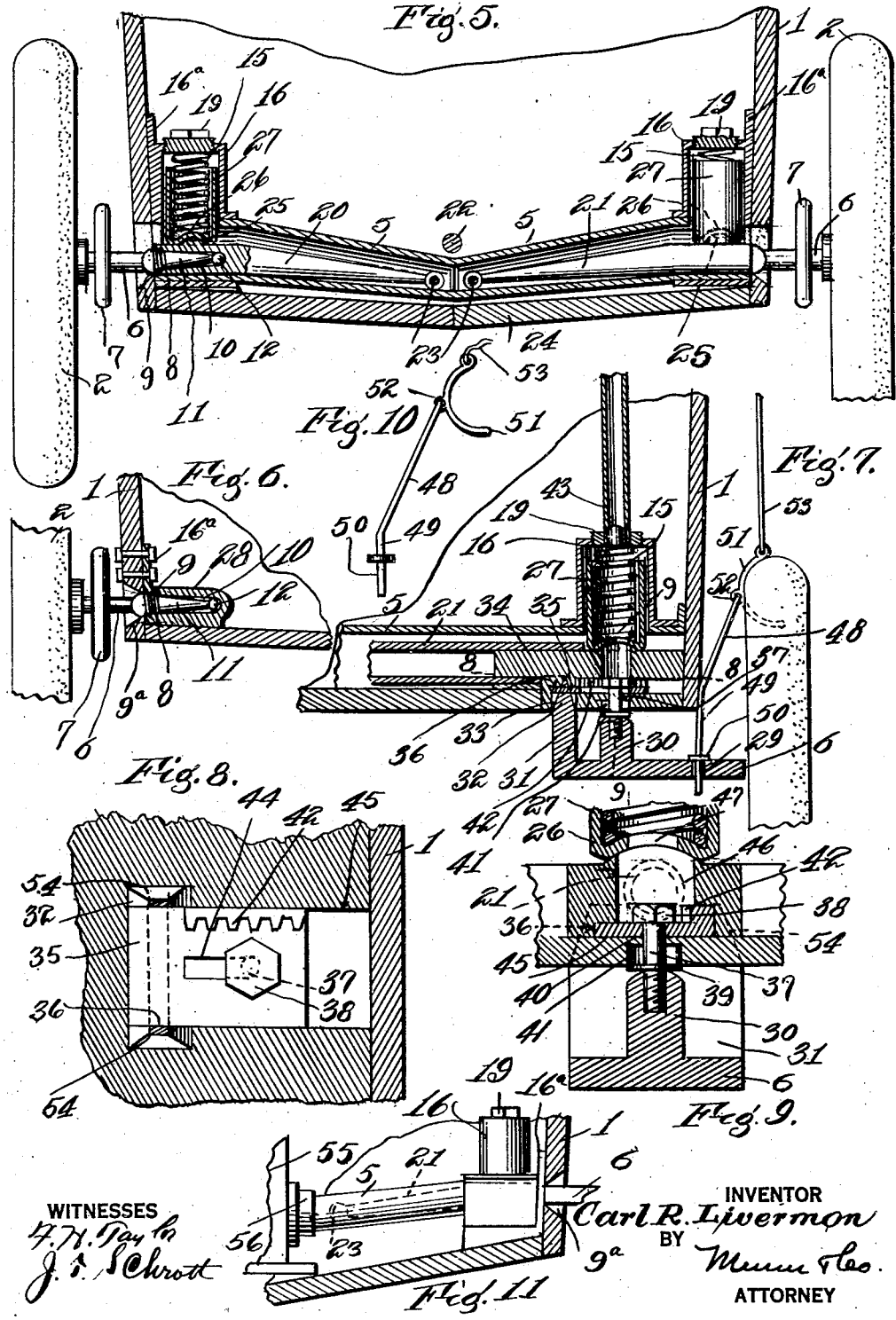

May 3, 1938.  C. R. LIVERMON  2,115,864
BOAT OR OTHER VEHICLE
Filed May 21, 1935  3 Sheets-Sheet 3
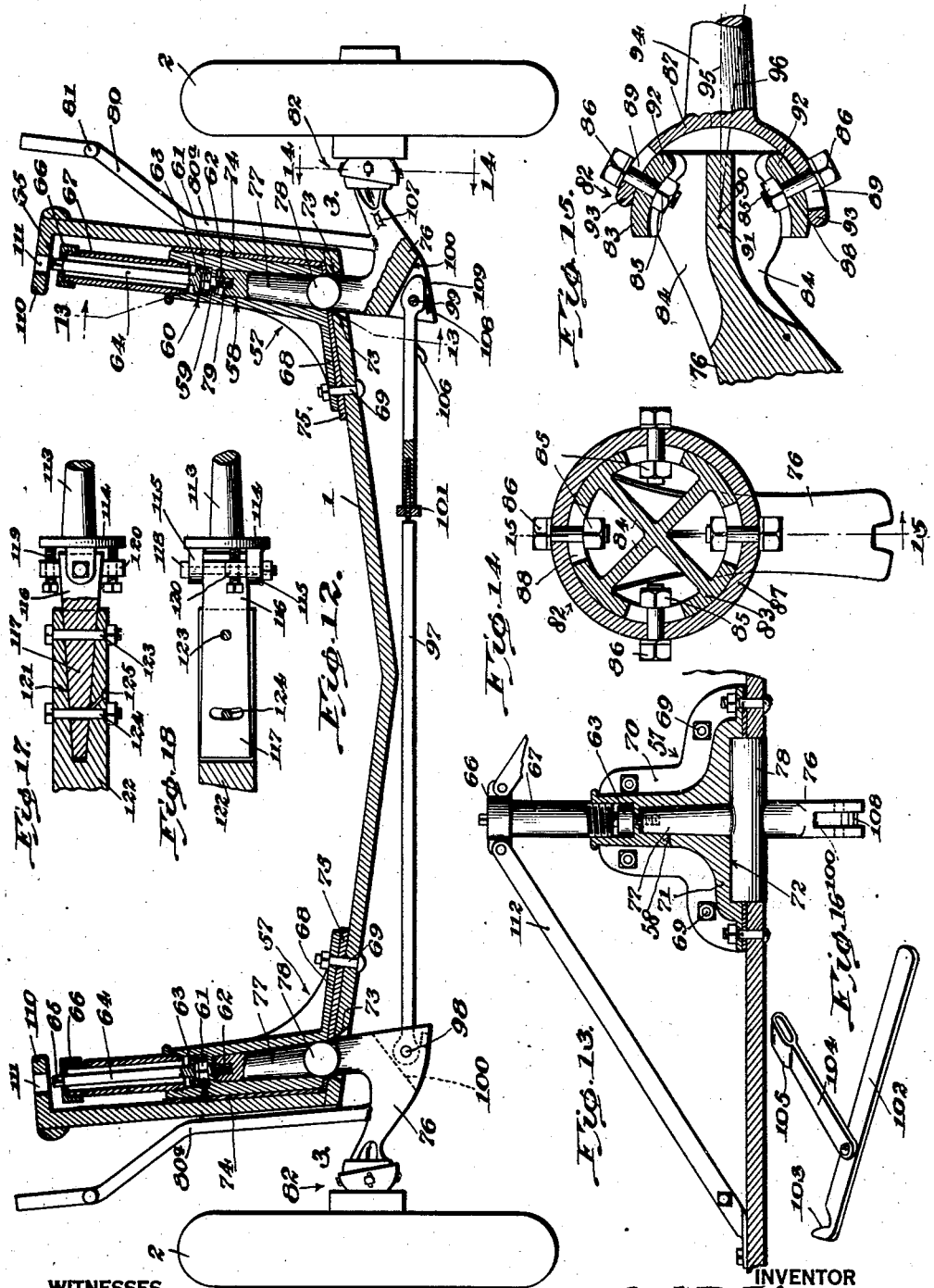
INVENTOR
Carl R. Livermon
BY
Munn, Anderson & Liddy
ATTORNEY Patented May 3, 1938

2,115,864

UNITED STATES PATENT OFFICE 2,115,864

BOAT OR OTHER VEHICLE

Carl R. Livermon, Roxobel, N. C.

Application May 21, 1935, Serial No. 22,620

27 Claims. (Cl. 9—1)

This invention relates to improvements in boats, and its objects are as follows:—

First, to provide a boat equipped with wheels for the purpose of enabling transportation of the boat over land, as for example when attached to an automobile or other towing vehicle, one of the chief characteristics of the wheels being a detachable mounting therefor which enables the emergency use of the detached wheels as life preservers.

Second, to provide a boat with wheels intended primarily for its transportation over land and subsequent launching when a body of water is reached, these wheels being attached with a mounting that enables the removal of the wheels after the boat is once set afloat.

Third, to provide means in the foregoing detachable mounting which will facilitate the replacement of the wheels prior to again running the boat up on the shore.

Fourth, to carry out several varieties of mechanical arrangements in the detachable mounting, the choice of one of these being governed largely by the size, weight, or design of the boat to be transported.

Fifth, to provide an improved socket and plug structure which is assisted by the buoyancy of the wheel in making connection, said structure including interengaging means to prevent relative turning of the plug and securing means to prevent the plug from dropping out of the socket.

Sixth, to provide a tie rod which is attachable from one stub axle to the other for the purpose of preventing appreciable movement of the wheel carriers with reference to the boat during overland transportation.

Seventh, to provide compensating means for positioning the wheels perpendicularly to the road and parallel to the line of travel, in other words into an efficient operating position so as to minimize tire wear, said means including a knuckle enabling adjusting the wheel spindle into any radial position within limits.

Eighth, to provide a wheel spindle which stands in an originally off-centered position with respect to the slot series, in other words, in radial deviation from a center erected perpendicularly from the circumferential slot series, enabling the establishment of the spindle in a new zone of adjustment upon turning it over and thereby providing a sector of vertical adjustment twice that which is possible if the original position of the spindle were perpendicular to the slot series.

Other objects and advantages will appear in the following specification, reference being had to the accompanying drawings in which—

Figure 1 is a side elevation of a boat, showing one of a pair of wheels with which it is equipped for its transportation over land.

Figure 2 is a cross section taken on the line 2—2 of Figure 1.

Figure 3 is an enlarged sectional detail of one of the brackets, particularly illustrating a portion of the detachable wheel mounting.

Figure 4 is a vertical section taken on the line line 4—4 of Figure 3.

Figure 5 is a cross section similar to Figure 2, illustrating a modification hereinafter described.

Figure 6 is a detail sectional view of a further modification illustrating a simplification in the bracket structure.

Figure 7 is a sectional view of a modification illustrating a latch arrangement as well as a wheel replacing device.

Figure 8 is a detail section taken substantially on the line 8—8 of Figure 7.

Figure 9 is a detail vertical section taken substantially on the line 9—9 of Figure 7.

Figure 10 is a detail perspective view of the foregoing wheel replacing device.

Figure 11 is a detail sectional view, parts being in elevation, of a further modification.

Figure 12 is a cross section of a boat illustrating a detachable mounting on the principle of the mounting in Figure 7 but disclosing a simplification in structure.

Figure 13 is a section substantially on the line 13—13 of Figure 12, the tie rod being omitted.

Figure 14 is a cross section taken on the line 14—14 of Figure 12, particularly illustrating the construction of the knuckle or universal joint.

Figure 15 is a section taken on the line 15—15 of Figure 14, the position of the parts in Figure 15 agreeing in position with corresponding parts in Figure 12.

Figure 16 is a detail perspective view of a tool to be used in applying the tie rod.

Figure 17 is a partially plan and sectional view of a modification of the knucle or universal joint in Figures 12 and 15.

Figure 18 is a partially sectional and side elevational view of the same structure.

This application is a revival in part of the application for patent for boat or other vehicle filed by Carl R. Livermon June 9, 1930, Serial No. 459,993 and allowed June 29, 1931.

It has already been indicated in the foregoing brief statements of the objects of the invention that one of the purposes is to equip a boat with wheels in order that it may be drawn over land for launching in a body of water. To this end, the boat will have an especial appeal to vacationists to whom water sports are an attraction and who are desirous of supplementing their automotive equipment with a boat.

It is deemed objectionable to leave the wheels on the boat while the latter is afloat. For this reason the wheels are detachably mounted so that after they have served their purpose in launching the boat they can be taken off and stowed in a safe place. In providing the wheels with the facility of detachability the equipment of the boat is given an important accessory.

The wheels herein used are of the pneumatic tire variety. These are capable of floating, and in addition to sustaining the weight of the metallic parts are also capable of sustaining substantial additional weights. It is, therefore, proposed to utilize the wheels as life preservers in an emergency.

Reference is made to the drawings. These illustrate a number of modifications, and where corresponding parts occur in the various views similar reference characters will be used to describe them without necessarily repeating the description.

In Figure 1 a boat 1 is equipped with pneumatic-tired wheels 2, each of which has a detachable mounting, generally denoted 3 (Figs. 2 and 3), upon an axle 4 which is situated in a tube 5 extending transversely of the boat. Although the ends of the tube are shown open at the sides of the boat (Fig. 3) this arrangement is not necessarily adhered to because there would be no purpose in having a free flow of water through the tube. However, for a simple arrangement, and one which enables the ready insertion of the axle 4 the tube 5 is left open at its ends as shown in Figures 2 and 3.

The detachable mounting 3 comprises a shaft 6 upon one end of which the bearing cones of the wheels 2 will be mounted. This shaft is fitted with a hand wheel 7 by means of which the shaft can be turned either for screwing it into or out of the adjacent end of the axle 4. For this purpose the shaft has a threaded portion 8 for screwing into a correspondingly threaded recess 9 at the outer end of a tapering socket 10 in the end of the axle 4. The recess 9 has a bevelled entrance 9ᵃ. The purpose in tapering the socket is to facilitate the insertion of a tapering end 11 of the shaft 6. The extremity of the tapering end has a ball 12 which is adapted to seat snugly in the correspondingly rounded bottom of the socket 10.

By making use of the ball 12 and making the taper of the end 11 more abrupt than the socket 10 a great deal of friction is eliminated while inserting and withdrawing the axle. Moreover, the use of the ball 12 obviates the possibility of the axle end 11 ever jamming in the socket 10. In other words, when the ball 12 is loosened from the socket at this point of connection the entire end 11 will be free for withdrawal.

Reverting to the axle 4, to which reference has been made, it is observed that this has an upstanding lug 13 at each end. Into this lug is screwed the threaded extremity of a pin 14. The combined lug and pin constitute a guide or pilot for a compression spring 15, and by virtue of extending up into a casing 16 for partly containing the spring, serve to keep the axle 4 from turning over in the direction of the length of the boat as well as pulling it to either side.

The casing 16 is part of a bracket 16ᵃ (Fig. 4) attached to the tube 5 as well as to the side and bottom of the boat and communicates with the latter through an opening 17. The spring 15 passes through this opening to a point of bearing on the axle 4, this point being defined by a cupped washer 18. A plug 19 closes the upper end of the casing. All joints around the casing are water tight.

In order that the spring 15 may function as a shock absorber during the transportation of the boat over land the tube 5 is made oval in cross section (Fig. 4). The tendency of the spring 15 is to seat the axle 4 on the bottom of the tube. During transportation the weight of the boat will lift the axle from the bottom of the tube and the axle will oscillate in the tube according to the jars and vibrations occurring during transit.

Thus far it will be understood that the wheel 2 (making reference to only one) is readily attachable and detachable by means of the hand wheel 7. This is used to screw the shaft 6 into the end of the axle 4. After the boat has been launched far enough from the shore so that the wheel 2 clears the bottom, the occupant will reach over and unscrew the shaft by means of the hand wheel 7. The wheel is stowed somewhere on the boat until the time arrives to replace it.

In Figure 5 the axle is made in two parts 20, 21. This is done to avoid the propeller shaft 22 which in some instances would be in the way. The near ends of the two-part axle are pivoted at 23 at points adjacent to the propeller shaft. In some broad constructions the propeller shaft 22 may be so situated as to involve the necessity of carrying the two-part axle across the top instead of beneath.

The tube 5 is correspondingly dished to avoid the propeller shaft, as is also the bottom 24 of the boat, although the latter is not dished to such a marked degree. The bracket 16ᵃ and its accessories is the same as the structure in Figure 3, but in lieu of the guide means 13, 14 the axle member is provided with a rounded protuberance 25 upon which the correspondingly shaped concavity 26 of a spring case 27 is seated.

In the transportation of the boat in Figure 5 there will be an up and down motion of each axle member 20, 21. The spring 27 is guided in the casing 16. It is necessary that there should be some compensation for the difference in motion, and it is the protuberance 25 and concavity 26 that furnish a ball and socket joint between which the spring case 27 may easily move relatively to the axle member during the rocking of the latter.

Figure 6 illustrates a simplification of the so-called bracket 16ᵃ. The identity of the wheel attachment with the showings in Figures 3 and 5 is to be noted. The bracket now merely comprises a fitting 28, appropriately secured to the boat, and provided with a socket 10 into which the tapering and ball end of the shaft 6 are inserted as before. This style of bracket will be suitable for many types of boats, it being observed that the underlying principle of detachability of the shaft 6 and wheel 2 are preserved.

Figures 7 to 10 illustrate a somewhat more elaborate detachable mounting, and particularly bring out a certain wheel replacing device which will prove useful and necessary. It is to be observed that the hand wheel 7 is omitted, shaft 6 now being of the non-turning variety.

The wheel 2 will be mounted on one end of the shaft 6 the same as before. The shaft has an opening 29 (Fig. 7), a boss 30 and a keeper 31. This keeper is a lug upstanding from the opposite end of the shaft 6, this end of the shaft being broadened (Fig. 9). The upper end of the keeper is sharpened at 32 in order to facilitate introduction in a socket 33 in the underside of a latch block 34 which is built in as a part of the axle member.

This axle member 21 (Fig. 7) may be regarded the same as the member 21 in Figure 5, the axle being a two-part affair. A latch 35 is projectible through an opening 36 in the keeper 31 for the purpose of assisting in securing the axle 6. The mounting of the axle is completed by a stud 37, (Figs. 7 and 9) which is screwed into the boss 30. It is solely by the latch 35 and the stud 37 that the axle 6 is held in place in the modification in Figure 7.

The stud 37 has a head 38 to which a wrench is applicable for turning in either direction. A flange 39 on the stud provides a swivel mounting in reference to the latch 35 and a web 40 that forms part of the block 34. The web is produced by the provision of a recess 41 in which the flange 39 is accommodated. The mounting of the stud 37 is perfectly loose until the boss 30 of the axle 6 is brought up into position beneath the block 34. Thereupon a wrench is applied to the head 38 and the stud is screwed home.

At one side of the latch 35 there is a rack 42 (Fig. 8). This rack is engageable by a pinion which when turned will drive the latch either to the left or right (Fig. 7) to engage or release the keeper 31. The wrench (not shown), to which reference has been made will be of the type having a pinion at one end and a socket at the other. When the pinion end of the wrench is inserted through a tube 43 and brought into engagement with the rack 42, turning of the wrench will move the latch 35 to the left to secure the keeper 31. Upon a reversal of the wrench the socket end will be fitted over the head 38 to screw the stud 37 home, as already explained. For the first purpose, the pinion end will have a recess large enough to fit over the head 38 and permit turning of the wrench without being obstructed.

A slot 44 (Figs. 7 and 8) in the latch 35 accommodates the stud 37. The latch is slidable in reference to the stud in a passage 45 in the block 34. A chamber 46 (Fig. 9) communicates with this passage. It is in this chamber that the head 38 is accessible through an opening 47 in the concavity 26 of the spring case 27. The tube 43, which is in line with the opening 47 and chamber 46, extendings approximately level with the gunwale of the boat and has its mounting in the closure 19.

Thus far it will be understood that in the act of applying the wheel 2 (Fig. 7) the axle will be fitted under the edge of the boat with the boss 30 in line with the socket 33. The latch 35 and stud 37 are then operated successively to secure the axle 6 in position.

This end is facilitated by a wheel replacing device which comprises a rod 48 having a bent end 49 to enter the opening 29 in the axle 6. A collar 50 limits the insertion and affords a rest. At its other end the rod 48 has a circular yoke 51 which is adapted to clasp a part of the tire and rim (Fig. 7). The yoke is pivoted to the rod at 52. The yoke has an attached cable 53, or its equivalent, by which the assemblage will be lowered.

In replacing the wheel 2 (Fig. 7) the occupant of the boat will insert the end 49 in the opening 29 of the axle 6 and clasp the wheel with the yoke 51. He now has a competent connection through which the wheel and axle can be lowered over the side by means of the cable 53.

Some kind of an indicating mark will be applied to the side of the boat with which the rod 49 will be registered in lowering. The spacing between the rod 48 and the boss 30 is such that the latter will be exactly in line with the stud 37 when the bent end 49 engages the boat side. Upon now pulling up on the cable 53 the boss 30 will be brought into registration with the stud and the sharpened end 32 of the keeper 31 moved into the socket 33. The assemblage will be held there until the latch 35 and stud 37 can be operated as previously explained.

The purpose of sharpening the keeper 31 at 32 is to facilitate the introduction of the latter into the socket 33. For the same purpose the transverse ends of the keeper will be bevelled at 54 (Fig. 9). If by any chance the occupant should be unable to make a perfect registration of the keeper with the socket the foregoing bevel will compensate for his inability and enable the insertion notwithstanding. After the keeper has once been inserted its rectangular cross section and the elongated shape of the socket 33 will insure registration of the boss 30 with the stud 37 without any further necessity of the occupant keeping the bent end 49 in line with the indicating mark on the side of the boat.

The distinction in Figure 5, brought out in reference to the change in shape of the tube 5, indicates the adaptability of the attachment to boats having various dispositions of the power plant. In Figure 11 the motor 55 is so located that it well provides a mounting for the tube 5, which in this instance is made sectional. A suitable collar 56 provides the mounting of one end of the tube upon the side of the motor. The axle member 21 is pivoted upon the tube in the manner already understood. In its other respects the arrangement in Figure 11 is identical with that in Figure 5.

The operation may be briefly repeated to advantage. The wheels 2 are used only for the transportation of the boat 1 over land excepting in a case of emergency when either one or both may be used as a life preserver. After the boat has been launched and the wheels run clear of the bottom they will be taken off by means of the detachable mountings. In Figures 2, 3 and 5 the occupant will reach over board and turn the hand wheel 7 until he has unscrewed the shaft 6 from the socket 10 of the axle 4 or members 20, 21 as the case may be.

Should he accidently drop a wheel he will be able to recover it because of its ability to float. In the instance of Figure 7, the wrench (not shown) will be lowered through the tube 43 first in one position, then the other respectively to release the stud 37 from the boss 30 and retract the latch 35 by virtue of working the pinion against the rack 42. Here it is not essential to apply the wheel replacing device 48, although it might be applied if desired. Ordinarily the occupant will reach over and pull the wheel aboard by hand.

In replacing the wheels preparatory to landing, the foregoing acts are reversed as will readily be understood. In the instance of Figures 2, 3 and 5 the wheel 2 is simply lifted overboard whereupon the ball 12 as well as the flared or bevelled end 9ª of the tapering recess 9 will assist the insertion of the tapering end 11 of the shaft 6. However, having gotten the latter in place the hand wheel 7 is turned until a firm connection is made. At this point it may be well to observe that the tube 5 is flush with the side of the boat. There are no protruding parts to interfere with the passage of the latter through the water when the wheels are removed. This is true of all forms of the invention.

Reverting to the application of the wheels, use will be made of the wheel replacing device 48 when replacing the wheel 2 in the modification in Figure 7. It is deemed unnecessary to repeat the description of the mode of applying this device, or repeating the description of the mode of extending the latch 35 and tightening the studs 37.

Figures 12 to 15 illustrate a structure which works on the general principle of that in Figure 7, but it embodies certain simplifications and improvements which are now described. The bracket in Figure 2, for example, has its counterpart in the bracket 57. This has a tapering socket 58 open at the bottom but closed at the top by a web 59. As a matter of practice it is immaterial whether the socket occurs in the bracket as in Figures 6 and 12, in the ends of an axle as in Figures 2 and 5 or elsewhere. The principle is to provide a socket structure into which the plug of a wheel carrier is insertible preparatory to making a fixed connection. Revert to Figure 12. Above the web there is a chamber 60 occupied by the head 61 of a bolt 62, and by the socket 63 of a wrench bar 64. The upper squared end 65 of this bar is exposed above the cap 66 of a tube 67 screwed into the chamber 60 to house the bar and provide means for preventing water leaking into the boat.

The lower end of the tube 67 provides an outstanding annular shoulder from which the top of the socket 63 is normally spaced. After a period of unscrewing of the bolt 62 the top of the socket will engage the outstanding shoulder and then compose a swivel connection. Upon continued turning of the wrench bar 64 the plug into which the bolt 62 is screwed will be driven out of the tapering socket 58 as is later explained.

A foot piece 68 extends inwardly with respect to the boat 1. Securing means 69 goes through this foot and through the bottom of the boat. The securing means may be applied otherwise, and corresponding means 69 are used to similarly fasten the bracket 57 at other points (Fig. 13), for example through a flange 70 which follows the general contour. This contour includes an enlarged base 71 (Fig. 13) which runs at right angles to the axis of the tapering socket 58 in the general direction of the length of the boat. This base is made with a substantially semicircular recess 72 which communicates with the socket 58. This recess is continued through the bottom of the boat, and the sides of that recess may be flared at 73 (Fig. 12).

It is to be observed that the foot piece 68 is made at an obtuse angle with respect to the socket 58. This is intended to agree with the generally prevailing angle between the side and bottom of a boat. It is rare that this angle is the same in any two boats, and in order to enable a tight fit of the bracket 57 into the corner provision is made of shims 74, 75 of wood which are shaved down to the proper thickness and into tapering form if necessary, or otherwise cut away until their emplacement behind and beneath the bracket results in a snug fit.

The detachable mounting or wheel carrier, again denominated 3 comprises what is now distinguished as a stub axle 76. This includes a plug 77 which is tapered to fit the socket 58. It has a cross bar 78 (Fig. 13) which rests in the recess 72 for the purpose of preventing turning of the stub axle. The plug 77 has a threaded hole 79 in its top end to receive the bolt 62, and when that bolt is turned in the proper direction the plug 77 will be held tightly in the socket 58.

A rod 80 is made integrally with the stub axle 76, its portion 80ª being a fixed distance from the axial center of the plug 77. After a certain distance the rod is bent outwardly and terminates in a handle 81 which facilitates manipulation. In emplacing the stub axle as in Figure 12 the portion 80ª acts as a gauge, striking the side of the boat and guiding the plug 77 into position for movement into the socket. In other words, the portion 80ª prevents the plug 77 from going under farther than the socket 58. After the final connection is made the rod 80 extends up beside the boat so that the handle 80 is well within the reach of the operator in readiness for the detachment of the mounting 3 when the time arrives.

A knuckle or universal joint, generally designated 82, forms an important part of the improvement. Its chief purpose is to provide an independent adjustment for the wheels 2 so that these may be stood perpendicularly to the road and parallel to the line of travel in each of a number of boats to which the mounting 3 may be successively applied. The first boat may be regarded as having the axis of the socket 58 in a certain angular relationship with respect to the road which necessitated a certain adjustment in the knuckle 82 to make the wheel stand as just stated. Desiring to apply the mounting 3 to a second boat it may be and probably will be found that the axis to the next socket 58 is situated differently with respect to the road. This will necessitate a further adjustment of the knuckle 82, and the provisions of the latter are all toward the end of making the adjustments universal within certain limits.

The structure of the knuckle comprises a semispherical annulus 83 (Fig. 15). This is an integral part of the stub axle 76, being connected with it by a crossed webbing 84 (Fig. 14) which, by nature of its form, leaves ample spaces through which the nuts 85 of bolts 86 are accessible. A semi-spherical cup 87 is applied to the annulus 83. The members 83, 87 are, in effect, a ball and socket joint. The bolts 86 are used to secure the cup 87 in various positions on the annulus 83.

For the purpose of admitting the bolts and at the same time making turning adjustments of the cup 87 both vertically and circumferentially with respect to the annulus 83, the latter and the cup 87 are provided with slots 88, 89 at right angles to each other so as to assume the form of a cross when viewed in plan. The slots 89 permit the vertical adjustments, assuming the nuts 85 to have been loosened, while the slots 88 permit the circumferential adjustments.

Note is to be made of the fact that the outer surface of the annulus 83 and the inner surface of the cup 87 are struck from the common center 90 (Fig. 15). The inner surface of the annulus 83 and the outer surface of the cup 87 are struck from the common center 91. The remote surfaces of 83 and 87 are therefore off-center with respect to the common adjacent surfaces.

The effect of these provisions is first a freedom of movement of the cup 87 in any direction within limits when the nuts 85 are loosened. Second, the provision of a bolt and nut lock which occurs on this wise:—The striking of the remote surfaces off-center enlarges the annulus 83 as at 92 and the cup 87 as at 93. Now consider the bolts and nuts to have been tightened for a given adjustment. Should there be a tendency of the cup 87 to turn in any direction on the center 90 the enlargement 93 on the side opposite the direction of turning would crowd under the heads of the bolts 86 in that zone, and in doing so would jam so as to prevent actual turning.

The enlargements 92, 93 have the further effect of aiding the bolts and nuts in drawing the cup 87 tightly against the annulus 83. The remote surfaces are parallel to each other by virtue of being struck from the common center 91. The adjacent contacting surfaces are not parallel to the remote surfaces. This variance brings about a wedge action when the nuts 85 are tightened on the bolts 86, drawing the cup 87 tightly against the annulus as already stated.

The off-setting of the center 91 does not necessarily occur along the axis of the knuckle 82. The center 91 might be placed to one side of the axis for the striking of a different set of remote curves for each of the four bolts 86. This is merely an enlargement of the principle already described. Its effect will be to exaggerate the remote curves with respect to the curvatures on the adjacent contacting surface, and to stand the bolts at a more decided inclination with respect to those surfaces so as to accentuate the wedge action already mentioned.

The wheel spindle 94 occupies an off-center position with respect to the circumferential series of slots 89. In other words, the axis 95 of the spindle 94 has a radial deviation from the perpendicular 96 of the slot series, considering the axes 95 and 96 as originating from the common center 90.

The amount of off-centering herein given as an example is 6°. The reason for off-centering the spindle is to enable turning the cup 87 completely over, thereby establishing the spindle 94 in a new zone of vertical adjustment. The total amount of adjustment of which the spindle 94 is capable occurs within a sector of 24°.

Take the position in Figure 15. The spindle 94 has been adjusted so that its axis 95 has been brought down to coincide with the horizontal plane. The result is that the axis of the respective wheel is horizontal, and the wheel stands perpendicular to the road.

In this adjustment the left end of the upper slot and the right end of the lower slot 89 will be stopped by the bolts 86. The remaining ends of the slots accommodate an adjustment of the spindle from the plane 95 to an extent of 12°. Upon turning the cup 87 completely over, the positions of the slots will be reversed and the zone of adjustment of the spindle will be 12° in the downward direction.

The foregoing figures are merely illustrative. The original off-center setting of the axis 95 with respect to the slot series may be more or less than 6°. If the axis 95 were perpendicular to the slot series, and not off-centered as it must now be understood to be, the range of adjustment would be strictly limited to the length of the slots 89 and the zone of adjustment would be only half of what it is with the spindle 94 off-centered as described.

Vibration of the boat during overland transportation would be likely to set up objectionable strains in each of the wheel carriers 3, and in order to prevent these, in other words make the wheel carriers as rigid with the boat as possible, provision is made of a tie rod 97 which is secured at 98, 98 to the opposite stub axles 76. The heels of these axles are slotted at 100 to receive the ends of the tie rod. The tie rod is longitudinally adjustable at 101. One end of the rod screws in to the companion portion, and the adjustments are set with a lock nut.

The securing means 98, 99 comprise removable pins. The tie rod 97 is placed in the position as shown in Figure 12 only during overland transportation. The rod is removed prior to launching the boat. In order to fit the tie rod in place it is necessary to use a tool of the type illustrated in Figure 16. This tool comprises a lever 102 with a hooked or equivalently shaped end 103. The lever carries a fulcrum bar 104 which terminates in a loop 105 or its equivalent. In order to enable the use of the tool the tie rod and stub axles 76 have projections 106, 107.

In use the tool (Fig. 16) is held substantially horizontal. The loop 105 is hooked over the projection 107 and the hook 103 is engaged with the projection 106. A turn of the lever 102 in the clockwise direction (looking down) will draw 76 and 97 together until the holes register and enable the pin 99 to be slipped in. The opposite end of the tie rod was previously affixed to the other stub axle by means of the pin 98.

In order to facilitate the application of the tie rod one or both of the stub axles 76 are provided with bridge pieces 108 which span the slots 100. One end of the tie rod is provided with an extension 109 which is temporarily rested on one of the bridge pieces while the opposite end of the tie rod is brought to position and secured to the other stub axle.

In doing that the tie rod 97 is naturally turned through the arc of a circle, and the extension 109 moves on the respective bridge piece as a fulcrum. That bridge piece then guides the hole in the extension into line with the holes in the respective stub axle. The tool (Fig. 16) is then applied, and when pressure is put on it in the proper direction all of the holes are drawn into registration in readiness to receive the pin 99.

The squared end 65 of the wrench bar 64 is directly accessible in an instance wherein the boat does not have a gunwale, but in cases wherein the boat does have a gunwale as at 110 (Fig. 12), the latter has a hole 111 through which the squared end is indirectly accessible by a suitable wrench. Either the hole 111 or the squared end 65 will serve as a sight across which the rod 80 will be gauged by the operator as an aid in working the plug 77 into the socket 58. In addition to securing the bracket 57 by the means 69 (Figs. 12 and 13), braces 112 may be employed as in Figure 13. These are simply iron straps suitably secured to the cap 66 at one end and to the sides and bottom of the boat at the other end, the latter being turned to suit the contour of the boat.

Figures 17 and 18, as previously indicated, illustrate a modification of the knuckle or universal joint in Figures 12 and 15. The structure in Figures 17 and 18 is a simplification of the latter, but special conditions will determine whether one or the other is preferable in use. According to the modification the spindle 113 carries a plate 114, usually circular but not necessarily so, which has a pair of lugs 115 branching out in back of it. These lugs fit over the hub part 116 of a plug 117

(similar to 11 in Fig. 3), and the fitting in of a bolt 118, or its equivalent, completes the hinge connection on which the spindle is capable of turning horizontally.

This turning is limited and the spindle is adjusted in position with respect to the boat by a pair of set screws 119. These are threaded into and through lugs 120 on the sides of the hub part 116, a little below the center (Fig. 18) until they engage the back of the plate 114. It is perfectly plain that by turning the set screws 119 in one direction or the other the spindle 113 will be turned on its axis, represented by the bolt 118, until the proper position of the spindle is reached.

The plug 117 is fitted in the crotch 121 of a member 122 which might either be an equivalent of the axle 4 in Fig. 3, or 76 in Fig. 12. Two bolts 123, 124 go horizontally through registering holes in the plug 117 and member 122. The bolt 123 is a pivot on which the plug 117 has limited turning in the original adjustment of the socket with respect to the member 122.

For this purpose the second hole in the plug 117 which takes the bolt 124 is in the form of a slot (Fig. 18). When the proper vertical adjustment of the plug 117 is arrived at the nut on the bolt 124 is tightened, and a sealing substance, for example Babbitt metal or lead is run into the slot (Fig. 18) through a duct 125 (Fig. 17). The slot space around the bolt 124 is thus completely filled with metal which, when hardened, absolutely fixes the plug 117 in its adjusted position. When desiring to disassemble the construction the two bolts are simply taken out and the plug 117 pulled from its position. The metal can either be knocked or melted out.

The operation is readily understood, and perhaps to particular advantage when considered in connection with Figure 12. The operator will attach the wheels 2 prior to landing. He takes hold of the handle 81 and by sighting the top part of the handle across either the hole 111 or squared end 65, holds the handle out at an appropriate distance from the side of the boat, preferably at an angle, and presses down. The plug 77, at first tending to drag the side of the boat, will soon go under whereupon the buoyancy of the wheel 2 (the wheel also being at an angle) will cause the plug to float up into its inserted position in the socket 58. It may be explained that the wheel is not always carried in the boat; in some instances the wheel may be moored in the water at a suitable anchorage. But in any case the handle is manipulated in the manner already explained in connecting the wheel with the boat.

Should the entrance to the socket 58 not be found the top end of the plug 77 will most likely enter the recess 72, whereupon it becomes merely a matter of shifting to one side or the other until the plug does enter the socket. The buoyancy of the wheel 2 combined with an upward pull by the operator completes the connection of the plug and socket. The stub axle 76 occupies its final true position when the cross bar 78 drops into the recess 72.

The next act is to apply a wrench to the squared end 65. This screws the bolt 62 home and holds the plug 77 absolutely tight. After having landed, the tie rod 97 is applied in the manner already brought out in detail.

Assume that the boat is about to be launched, the wheels having been secured in an earlier operation as described above. After the boat is floated the wheels 2 are to be removed. The wrench is applied to the squared end 65 whereupon turning occurs until the top of the socket 63 engages the lower rim of the tube 67. Until this time there is merely an unscrewing of the bolt 62, but when engagement occurs the socket 63 is converted into a swivel member which upon continued turning forcibly loosens the plug 77 from its tapering socket 58. The operator then takes hold of the handle 81 and bears down until he totally disengages the plug 77, whereupon he hauls the wheel 2 aboard.

It is apparent from the last description that the socket 63 is finally converted into a pressure member by which the plug 77 is loosened. Were it not for the initial unscrewing of the bolt 62 prior to loosening the plug it is likely that some difficulty would arise in making the disconnection. For example, if the loosening act occurred simultaneously with the beginning of unscrewing of the bolt 62 the buoyancy of the wheel 2 would throw the plug 77 enough off-center to possibly damage the threads of the bolt 62.

By delaying the forcible loosening until the last part of the unscrewing of the bolt the latter will be so nearly out of the hole 79 by the time the plug 77 begins to wabble, that no damage will result.

In addition to the invention being an improvement in boats, it has a broader aspect in which the attachment is featured as a principal part. It is conceivable that the attachment might be applied to vehicles other than boats, and when so applied made to function in precisely the same manner. That is to say, the attachment would function for the transportation of the vehicle over land, but when the vehicle is passed on to another medium the wheels may be removed just as before. Some of the claims are drawn with this broader aspect of the invention in view.

I claim:—

1. A vehicle, an axle member mounted on the vehicle and having a tapering socket, a wheel, a shaft on which the wheel is journalled having an end seatable on the bottom of the socket, and coupling means at the outer end of the socket and on the shaft being fully connected when its end is seated.

2. A vehicle, an attachment comprising a combined wheel and screw shaft on which the wheel is journalled, a screw socket in the vehicle, and means on the shaft by which to turn it when the screw part of the shaft is in place in the socket.

3. A vehicle, means on the vehicle having a tapering socket and a threaded recess, a wheel, and a shaft on which the wheel is journalled, having a threaded portion and a tapering end terminating in a ball insertible in the socket to bring the threaded portion and recess into registration.

4. A vehicle, a wheel therefor having a shaft for its journalled support, an axle member movably mounted on the vehicle to which axle member the shaft is attachable, and resilient means bearing on the axle member, providing a shock absorber for the cushioned support of the vehicle when the wheel is mounted.

5. A vehicle, a wheel therefor having a shaft for its journalled support, an axle member swingably mounted at one end on the vehicle to which axle member the shaft is attachable, and resilient means bearing on the opposite end of said member, tending to resist its swinging movements.

6. A boat, a wheel, a movable axle to which the wheel is attachable for over-land transportation of the boat, and means in which the axle is movable, being fitted in the boat to exclude water when the boat is launched.

7. A boat, a wheel having a shaft attachable to the boat for its over-land transportation, and socket means in which the shaft is fitted and from which the shaft is removable when the boat is launched, said means being flush with the boat surface to avoid obstruction to the passage of the boat through the water.

8. In combination with a boat, an axle member movably mounted on the boat and having a socket, and a wheel attachable to the boat for its over-land transportation, having a shaft securable in the socket.

9. In combination with a boat, an axle member having a socket, a wheel having a shaft movably mounted on the boat and being securable in the socket, a spring to cushion the movable axle member, a bracket affixed to the boat having a casing receiving part of the spring, and guide means on the axle member piloting the spring and extending into the casing to prevent turning or pulling out of said axle member.

10. In combination with a boat, a tube having an end open at the side of the boat, a bracket in which the tube is secured being affixed to the boat and having a casing communicating with the tube, a wheel having a shaft, an axle member to which the shaft is securable being movable in the tube, a spring in the casing extending through the opening and bearing on the tube to cushion its movements, and guide means on the axle member extending through the opening into the casing, piloting the spring and preventing turning or pulling out of the axle member.

11. In combination with a boat, a tube having an open end in communication with the outside of the boat, an axle member pivoted in the tube and having a socket, a wheel having a shaft insertible in the socket at the open end of the tube, a spring bearing on the axle member to cushion its pivotal movements, and means constituting a ball and socket joint between the spring and axle member.

12. A boat having a bevelled entrance opening in one side, a bracket secured to the boat having a fitting with a socket communicating with the opening, said socket having a threaded recess, and a wheel attachable to the boat, having a shaft with a tapering end insertible through the opening into the socket, said end having a threaded portion to be screwed into said recess.

13. A boat, a movable axle having a latch block with a socket, a screw stud swivelled on the latch block, a wheel having a shaft with a boss into which the stud is screwed and a keeper having an end with an opening insertible in the socket, and a latch guided on the latch block, having a rack which is operable to slide the latch through said opening and assist the stud in holding the shaft in place.

14. In combination with a boat, an attachment for the over-land transportation of the boat comprising an axle member with a latch block having a swivelled screw stud and a socket, a wheel having a shaft with a boss in which the stud is securable and a keeper to enter the socket, and means temporarily attachable to the wheel and shaft for suspending the wheel overboard preparatory to mounting it on the boat, said means being engageable with the side of the boat in a predetermined position to approximately register the boss and keeper with the respective screw stud and socket.

15. In a vehicle for land and water transportation, a pneumatic-tired wheel to support the vehicle on land and capable of floating in the water, means on which the wheel is mounted constituting the sole connection of the wheel with the vehicle, and a hand wheel on said means operable by reaching over the side of the vehicle for disconnection of the wheel and subsequent use as a life preserver.

16. In a boat, an attachment for the over-land transportation of the boat and operable from inside of the boat while afloat comprising a receiving locking means on the boat, wheel carrier means comprising a complemental lock, said carrier means having a buoyant wheel revolubly secured thereon and being normally separate from the boat, and means extending from the carrier means within reach of a person in the boat, capable of manual handling from inside of the boat for resisting the tendency of the wheel to float and supporting when overboard and manipulating the wheel carrier means into locking position with the receiving locking means.

17. In a boat, a normally detached wheel which is temporarily attachable for the over-land transportation of the boat, a plug and socket structure to be interfitted so as to attach the wheel to the boat, said wheel being carried by one of said structures, and manually operable means attached to the structure which carries the wheel, extending into approximate level with the gunwale of the boat for overboard manipulation of the wheel while the boat is afloat until said plug and socket structure are registered.

18. In a boat, a wheel, an axle structure revolubly carrying the wheel and being attachable to the boat for its over-land transportation, means on the boat to which the axle structure is attachable, means on the axle structure extending up beside the boat into approximate line with the gunwale to enable manipulating the axle structure from inside of the boat, securing means accessible from within the boat for securing or releasing the axle structure, and means combined with said means on the boat for preventing the leaking in of water around said securing means.

19. In a boat, a socket carried by the boat and being accessible from the outside of the boat, said socket having a recessed member on the outside of the boat, a wheel, carrier means for the wheel having a plug, means by which the carrier means is manually operable when the wheel is overboard to engage the plug with the recess for guidance into the socket, and means on the carrier means then dropping into the recess to prevent the plug from turning.

20. In a boat, a socket carried by the boat and being accessible from the outside of the boat, said socket having a recessed member on the outside of the boat, a wheel, carrier means for the wheel having a plug, means by which the carrier means is manually operable when the wheel is overboard to engage the plug with the recess for guidance into the socket, means on the carrier means then dropping into the recess to prevent the plug from turning, and wrench-operable means carried by the socket to be screwed into the plug to make a permanent connection.

21. In a boat, a wheel for the over-land transportation of the boat, a spindle on which it is revoluble, an axle structure, plug and socket structure for making a connection of the axle structure with the boat so as to locate the axle structure in a predetermined position with respect to the boat, and a knuckle connecting the spindle with the axle structure for universally adjusting the spindle within limits with respect to the axle structure, said knuckle comprising an annulus on the axle structure and a cup on the spindle, said annulus and cup having crossed slots, and securing means going through the slots to hold the annulus and cup in interengagement.

22. In a boat, a wheel for the over-land transportation of the boat, a spindle on which the wheel is revoluble, an axle structure, interconnectible means respectively on the boat and the axle structure for affixing the wheel to the boat, a knuckle connecting the spindle with the axle structure, means for making adjustment in the knuckle so as to variously dispose the spindle with respect to the axle structure, means for self-locking the spindle from movement after an adjustment has been made, said means comprising an annulus on the axle structure and a cup on the spindle, being in contact and having the contacting surfaces struck from a common center, the remote surfaces being struck in common on a different center to enlarge opposite portions of the annulus and cup, and tightening means going through the annulus and cup against which the enlarged portions are adapted to jam.

23. In a vehicle, an axle member mounted on the vehicle and having a smooth tapering socket, a wheel, a shaft on which the wheel is journaled having a smooth end seatable on the bottom of the socket, and coupling means at the outer end of the socket and on the shaft both being spaced from the smooth end being fully connected when its end is seated.

24. In a boat, a wheel for its over-land transportation, an axle structure by which the wheel is revolubly carried, a plug on said structure and a socket on the boat, and a rod integral with the axle structure extending up in line with the plug and terminating in a handle, said handle and rod enabling manual manipulation of the axle structure when the wheel is overboard to work the plug into the socket.

25. In a boat having means providing a socket, an axle structure having a plug and a buoyant wheel, and a handle attached to the axle structure for so manipulating said structure overboard as to utilize the buoyancy of the wheel in driving the plug into the socket.

26. A boat having means providing a socket having an opening underneath the boat a limited distance from its side, an axle structure having a plug and a buoyant wheel, and a handle affixed to said structure for manipulating said structure overboard to utilize the buoyancy of the wheel in inserting the plug in the socket, said handle having a portion adapted to engage the side of the boat and limit the position of the plug under the boat.

27. In a boat, a pneumatic-tired wheel for the boat, and means enabling the double use of said wheel as the boat support on land and as a life preserver when the boat is floating on water, said means comprising two elements which constitute the sole connection of the wheel to the boat, securing means coupling the elements for land running, and manipulating means situated between the wheel and gunwale of the boat, therefore being readily operable from the boat by reaching over the gunwale for disconnection of the wheel from the floating boat enabling the use of said wheel as a life preserver.

CARL R. LIVERMON.